United States Patent
Gentil et al.

(10) Patent No.: US 9,935,415 B2
(45) Date of Patent: Apr. 3, 2018

(54) BRUSH BOX FOR ELECTRIC MACHINE BRUSH-HOLDER AND CORRESPONDING BRUSH-HOLDER

(71) Applicant: VALEO EQUIPEMENTS ELECTRIQUES MOTEUR, Créteil (FR)

(72) Inventors: Maximilien Gentil, Corbas (FR); Alexandre Saltel, Bron (FR)

(73) Assignee: Valeo Equipements Electriques Moteur, Creteil (FR)

( * ) Notice: Subject to any disclaimer, the term of this patent is extended or adjusted under 35 U.S.C. 154(b) by 377 days.

(21) Appl. No.: 14/427,922

(22) PCT Filed: Sep. 27, 2013

(86) PCT No.: PCT/FR2013/052297
§ 371 (c)(1),
(2) Date: Mar. 12, 2015

(87) PCT Pub. No.: WO2014/049290
PCT Pub. Date: Apr. 3, 2014

(65) Prior Publication Data
US 2015/0244130 A1 Aug. 27, 2015

(30) Foreign Application Priority Data
Sep. 28, 2012 (FR) ..................... 12 59192

(51) Int. Cl.
*H01R 39/38* (2006.01)
*H01R 39/00* (2006.01)
*H01R 39/24* (2006.01)
*H01R 39/40* (2006.01)
*H01R 39/415* (2006.01)
*H02K 5/14* (2006.01)

(52) U.S. Cl.
CPC .......... *H01R 39/40* (2013.01); *H01R 39/383* (2013.01); *H01R 39/415* (2013.01); *H02K 5/148* (2013.01); *H01R 39/381* (2013.01); *H01R 2201/26* (2013.01)

(58) Field of Classification Search
CPC ................................ H02K 3/34; H01R 39/40
USPC ................... 310/242, 243, 245, 238, 239
See application file for complete search history.

(56) References Cited

U.S. PATENT DOCUMENTS

| 6,144,134 A * | 11/2000 | Lin ..................... H01R 39/40 310/238 |
| 2004/0245886 A1* | 12/2004 | Uchida ................ H01R 39/59 310/239 |
| 2007/0241631 A1 | 10/2007 | Lamprecht |

FOREIGN PATENT DOCUMENTS

| EP | 0724325 | 7/1996 |
| EP | 0935318 | 8/1999 |

(Continued)

Primary Examiner — Jose Gonzalez Quinones
(74) Attorney, Agent, or Firm — Berenato & White, LLC

(57) ABSTRACT

A brush box (23) for a brush-holder, which is useful as a housing for an electric machine brush (25). The brush box (23) comprises a lower portion (56) for guiding the brush, connected to a mounting (60), and an upper portion (58) for guiding the brush, the lower (56) and upper (58) guiding portions being open on the side of a front surface (35) and a rear surface of the brush (25). The lower (56) and upper (58) guiding portions are separated from one another by a space (61) enabling a braid of the brush (25) to pass through.

19 Claims, 5 Drawing Sheets

(56) References Cited

FOREIGN PATENT DOCUMENTS

EP           0935318 A2 *   8/1999   ......... H01R 39/381
EP           1788670          5/2007

* cited by examiner

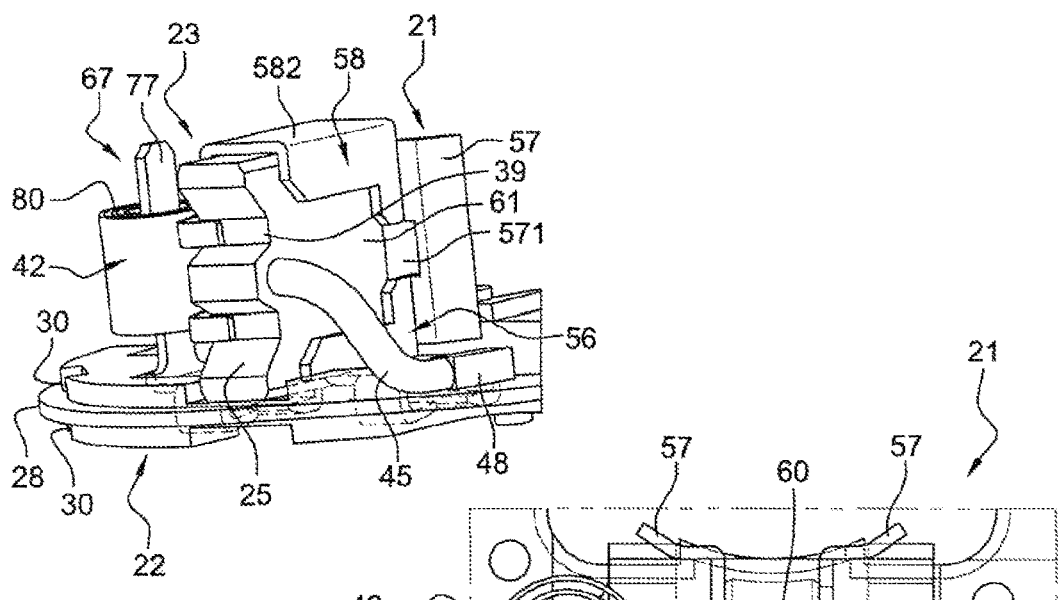
Fig. 1a
Fig. 1b
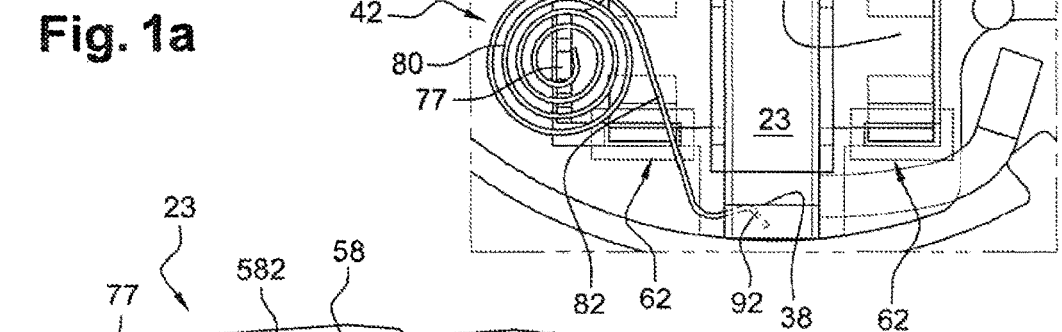
Fig. 2a
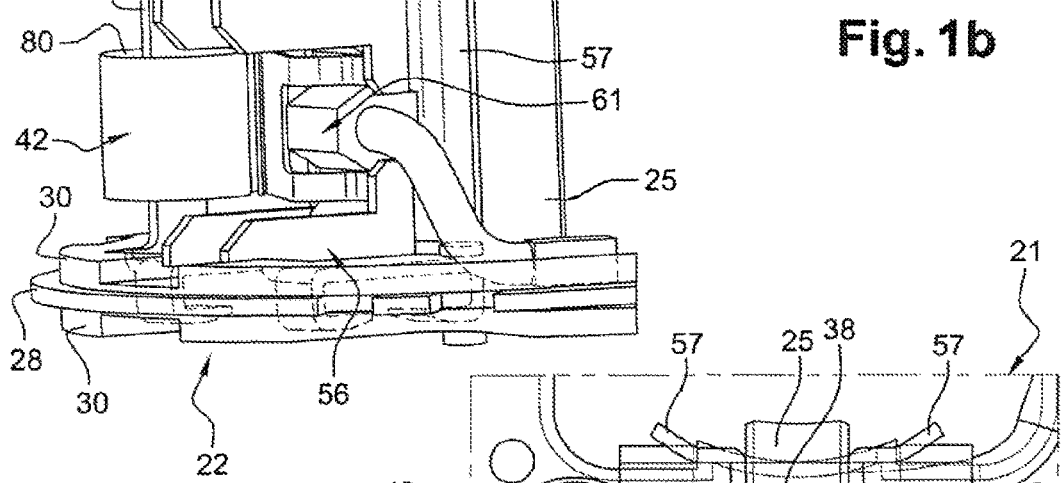
Fig. 2b

US 9,935,415 B2

BRUSH BOX FOR ELECTRIC MACHINE BRUSH-HOLDER AND CORRESPONDING BRUSH-HOLDER

CROSS-REFERENCE TO RELATED APPLICATIONS AND CLAIM TO PRIORITY

This application is a national stage application of International Application No. PCT/FR2013/052297 filed Sep. 27, 2013, which claims priority to French Patent Application No. 1259192 filed Sep. 28, 2012, of which the disclosures are incorporated herein by reference and to which priority is claimed.

TECHNICAL FIELD OF THE INVENTION

The invention relates to a brush cage, also known as a case, for a brush-holder of an electrical machine, as well as to the corresponding brush-holder.

The invention has particularly advantageous, but not exclusive, application with electrical machines which are used in motor vehicle starters. In particular, the invention is implemented with starters used with vehicles which are equipped with the function of starting and restarting of the thermal engine (so-called stop and start function), according to which the thermal engine of the vehicle is stopped for reasons of traffic conditions (in particular during stoppage at a red light), and is then restarted in order to make fuel savings.

PRIOR ART

In order to start a thermal engine, in particular of a motor vehicle, it is known to use a rotary electrical machine in the form of a starter provided with a launcher which can transmit rotation energy of the starter to a crankshaft of the thermal engine by means of a drive crown.

This launcher, which is displaced by a lever connected to a mobile rod of a contactor, is fitted on an output shaft of the electrical machine, if applicable by means of a speed reducer.

The electrical machine is provided with a stator, or inductor, consisting of a head and a magnetised structure with a plurality of permanent magnets which are generally made of ferrite. The machine also comprises a rotor, or armature, comprising conductors which form the winding of the rotor. For this purpose, the rotor comprising a core formed by laminated plates has longitudinal notches which are separated by teeth, with the conductors being inserted in the interior of these notches.

The machine also comprises at least two brushes which are made of electrically conductive material, arranged in the interior of the brush-holder, in order to make possible the electrical supply to the rotor by switching of the electric current in the conductors of the rotor.

For this purpose, each brush comprises a body with a front surface which is designed to rub against a collector with conductive plates which are connected to the winding of the rotor, these plates being separated by gaps which are provided with an insulator. Brushes also comprise a securing area which is connected to an end of an electrically conductive element known as a braid. One braid ensures the electrical supply to one of the brushes, whereas the other braid ensures earthing of the other brush via a metal housing of the starter.

A spring which is supported against a cover of the starter exerts a force in the direction of the collector on the body of each brush, in order to ensure the contact between the brush and the plates of the collector.

Since the number of operating cycles of the starters which are used with systems of the stop and start type is very large, the need exists to modify the existing configuration of the brush cage and the brush-holder in order to increase the service life of the brushes.

SUBJECT OF THE INVENTION

The objective of the invention is to fulfill this need by proposing a brush cage for a brush-holder which acts as a receptacle for a brush of an electrical machine, comprising a front surface of the brush which is designed to be supported against a collector, a rear surface of the brush against which a spring is designed to be supported, and, on at least one of these surfaces which connect the front surface to the rear surface, a space between the first and second guiding portions, in order to permit the passage of a braid of the brush as far as the end of a front surface.

Thus, the brush cage allows the brush to be worn as far as the braid. It will be appreciated that the brush cage can comprise a stop so that the braid cannot touch the collector, whilst making it possible to increase the service life of the brush by increasing the functional distance of the brush. For example, the stop can be situated such that the braid comes into contact with the stop when the braid is situated at a predetermined distance from the collector, for example 0.5 mm.

Thus, the brush cage which is used as a receptacle for a brush of an electrical machine comprises a first portion for guiding the brush, and a second portion for guiding the brush, these first and second guiding portions being open on the side of a front surface of the brush which is designed to be supported against a collector, and on the side of a rear surface of the brush against which a spring is designed to be supported, the brush cage comprising at least one space between the first guiding portion and the second guiding portion, in order to permit the passage of a braid of the brush as far as the end of a front surface.

According to one embodiment, the space is situated in a lateral surface of the brush cage which separates two lateral walls.

According to another embodiment, the space is situated in a transverse surface of the brush cage which separates two transverse walls.

According to one embodiment, the first portion is a lower guiding portion formed by two lateral walls which are parallel to one another, and the second portion is an upper guiding portion formed by two lateral walls which are parallel to one another, and the two lateral walls are connected to one another at least by a transverse wall.

According to one embodiment, the brush cage comprises two spaces between the first and second guiding portions, in order to permit the passage of a braid of the brush as far as the end of a front surface, on two opposite faces of these surfaces which form the contour of the first and second portions.

According to one embodiment, the brush cage comprises two flaps which connect the first and second guiding portions to one another, each flap comprising an opening which is situated in the extension of the space between the first and second guiding portions, in order to permit displacement of the braid of the brush as close as possible to a collector of the electrical machine.

This permits displacement of the braid of the brush as close as possible to a collector of the electrical machine, whilst preventing the collector from being touched. In addition, it makes it possible to contain electric arcs between the brush and the collector, in order to protect the electrical machine.

According to one embodiment, a dimension of the space between the first guiding portion and the second guiding portion tends to decrease when displacement from the rear towards the front of the brush cage takes place.

According to one embodiment, the brush cage comprises a support (60) which is connected to one of the first and second portions, and the support comprises at least one system for securing of the brush cage on a body of the brush-holder.

According to one embodiment, the securing system comprises two branches forming a hook, which are turned back towards one another at the level of their end.

According to one embodiment, the brush cage comprises at least one system for retention of a spiral spring.

According to one embodiment, the retention system is formed by a pin.

According to one embodiment, the pin has a substantially rectangular cross-section.

According to one embodiment, the pin has two parts with different cross-sections which delimit a shoulder at the level of a junction between the two parts.

According to one embodiment, the retention system comprises three teeth, with one of the teeth situated between the other two teeth being positioned on a plane which is offset relative to the plane on which the other two teeth are situated.

The invention also relates to a brush-holder for an electrical machine, characterised in that it comprises a body, at least one brush cage according to the invention secured on the said body, a brush which is positioned in the interior of the brush cage, a connection braid which is connected to the brush and a spring (42) which is fitted such as to exert a force between the brush and the body, the spring being in contact on the rear surface of the brush (25), the braid being connected to a surface of the brush which faces the space between the first and second portions of the brush. According to one embodiment, the brush comprises two support surfaces which are defined by the base of recesses provided in a rear surface of the brush, and the braid is connected to the brushes between these two recesses.

According to one embodiment, the spring is of the spiral type, and has an end which is folded in the form of a "U" and two sets of spirals each derived from one of the stems of the "U" opposite one another, each set of spirals ending in an arm with a return which is designed to be supported against a surface of the brush.

According to one embodiment, the spring is of the spiral type, and comprises a wound part which is formed by a plurality of substantially concentric spirals of a flat strip which is wound around itself, the wound part ending in a flat end which is extended by at least one arm designed to be supported against the surface of the brush.

BRIEF DESCRIPTION OF THE FIGURES

The invention will be better understood by reading the following description and examining the figures which accompany it. These figures are provided purely by way of illustration of the invention which is in no way limiting.

FIGS. 1a and 1b show views in perspective and from above of a first embodiment of a brush-holder according to the invention;

FIGS. 2a and 2b show views in perspective and from above of the brush-holder in FIG. 1 when the brush is worn;

Figure 3:
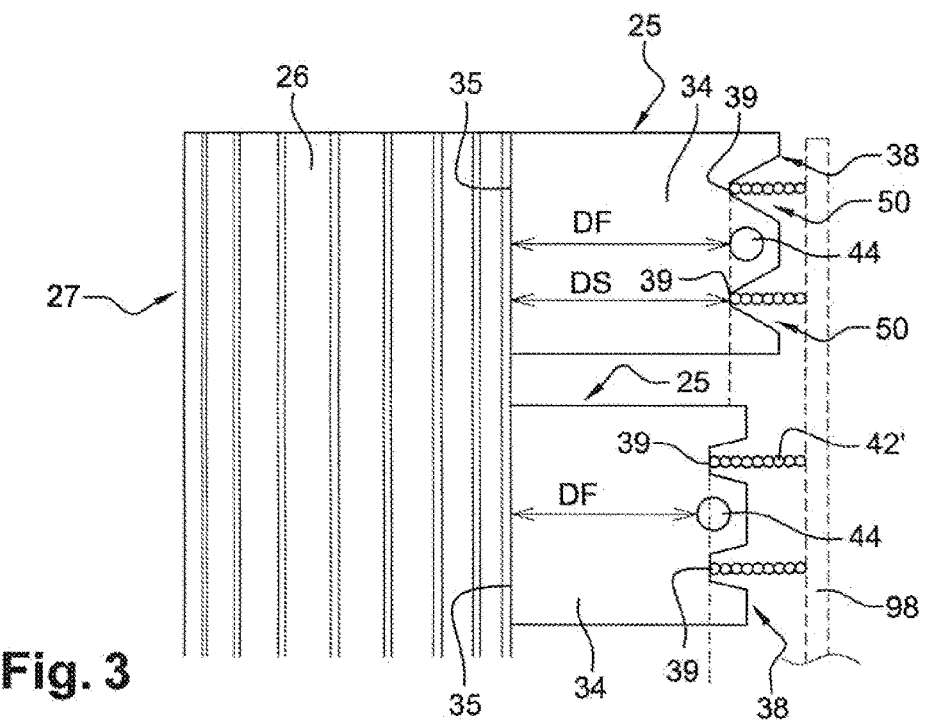
FIG. 3 shows a view from above of two brushes used with a brush-holder according to the invention, with different functional distances.

Elements which are identical, similar or analogous retain the same reference from one figure to another.

DESCRIPTION OF EMBODIMENTS OF THE INVENTION

FIGS. 1a, 1b, 2a, 2b and 5a to 5c show a brush-holder 21 according to the invention comprising a body 22 and at least one case 23 which is secured on the body 22, and acts as a receptacle for a brush 25. In this case, the brush-holder can comprise two brush cages. In the figures which correspond to partial views, a single brush cage or case 23 can be seen. Each brush 25 is fitted such as to slide axially in the interior of the brush cage 23, in order to co-operate with a collector 27 of a rotor of an electrical machine which can be seen in FIG. 3. For this purpose, a spiral spring 42 provided with arms tends to thrust the brushes 25 towards contact plates 26 of the collector 27 which are supported by a body of the collector made of electrically insulating material such as plastic material. The electrical machine is for example the machine of a starter of a motor vehicle. As a variant, the electrical machine can also be in the form of an alternator or an alternator-starter.

Figure 5A:
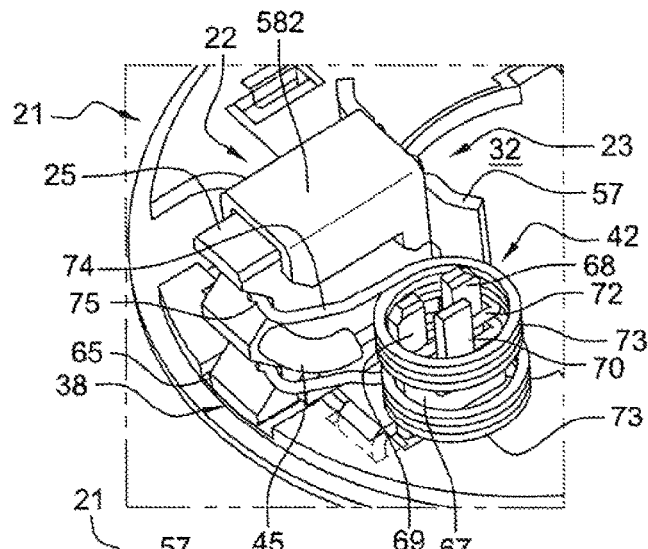
FIGS. 5a to 5c show respectively views in perspective, from above and from the side, of a second embodiment of the brush-holder according to the invention.
Figure 5B:
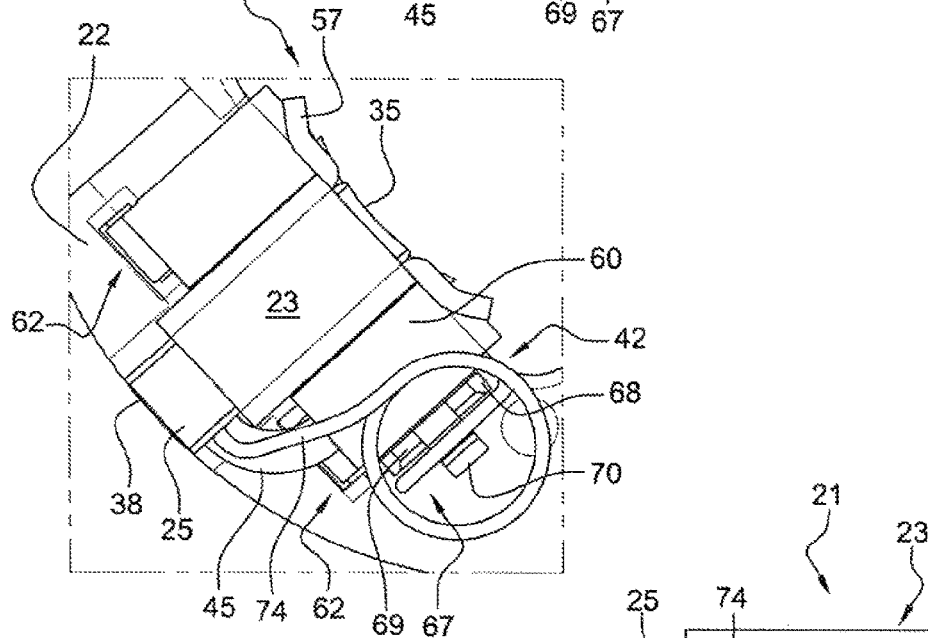
Figure 5C:
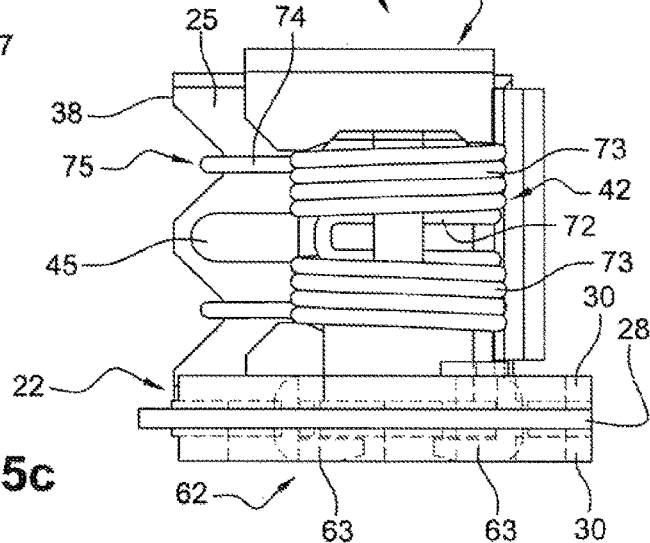

More specifically, as can be seen clearly in FIGS. 1a, 2a and 5c, the body 22 of the brush-holder comprises a bearing plate 28 which is made of an electrically conductive material, and two parts 30 made of insulating material which are placed on both sides of the bearing plate 28. This body 22 has a central opening 32 (cf. FIG. 5a) for the passage of the collector 27. The body 22 comprises openings so that it can be secured for example by means of screws (not represented) on a cover of the starter.

In addition, each brush 25 shown in detail in FIG. 3 comprises a body 34 with a substantially parallelepiped form, with a surface 35, known as the front surface, which is designed to rub against the contact plates 26 of the collector 27. A rear surface 38, opposite the front surface 35, comprises two support surfaces 39 for a spring 42 which is designed to exert a force on the body 34 in the direction of the collector 27. More specifically, as described hereinafter, the spring 42 is a spiral spring provided with arms 74 or 82 which are designed to come into contact with the support surfaces 39 of the brush 25.

The body 34 also comprises an area 44 for securing with an end of an electrically conductive element known as a connection braid 45. The securing area 44 of the braid 45 is situated between the two support surfaces 39, on a lateral surface of the body 34 perpendicular to the front 35 and rear 38 surfaces. The two support surfaces 39 correspond to bases of recesses 50 provided on both sides of the securing area 44. The securing area 44 is thus positioned on a protuberance delimited by the recesses 50, which in the figure are in the form of a "V" in order to facilitate the guiding of the arms of the spring 42.

For the brush 25 represented at the bottom of FIG. 3, the area 44 of securing of the braid 45 is situated at the rear part of the support surfaces 39, on the side opposite the front surface 35 of the brush 25. In other words, if, in a view from above, the surface of the face of the brush 25 which contains the area 44 of connection is delimited in two spaces separated by the straight line which passes via the support surfaces 39, at least part of the area 44 of connection is on the side of the space which is situated on the rear surface 38 side.

For the brush 25 represented at the top of FIG. 3, the area 44 of securing of the braid 45 is situated completely behind the support surfaces 39. In this case, the smaller distance DS between the support surfaces 39 and the front surface 35 of the brush 25 is equal to the functional distance DF of the brush 25. This distance DF corresponds to the smaller distance between the front surface 35 and the end of the securing area 44 which is closest to the front surface 35.

It can be noted that a configuration of this type of the brush 25 makes it possible to maximise the functional distance DF, and therefore to increase the service life of the brush 25.

The braid 45 one of the brushes 25 connects this brush 25 electrically to the cover in this case via a metal lug 48 which is secured on the bearing plate 28 of the body 22 of the brush-holder (cf. FIG. 1a). For this purpose, the braid 45 is advantageously made of copper or copper alloy in order to facilitate the welding on the lug 48. This braid thus ensures earthing via the metal housing of the starter. Another copper braid 45, which is integral with the other brush (not represented), connects this other brush 25 electrically to an electrical supply, if applicable via a terminal of the contactor of the starter.

Figure 4A:
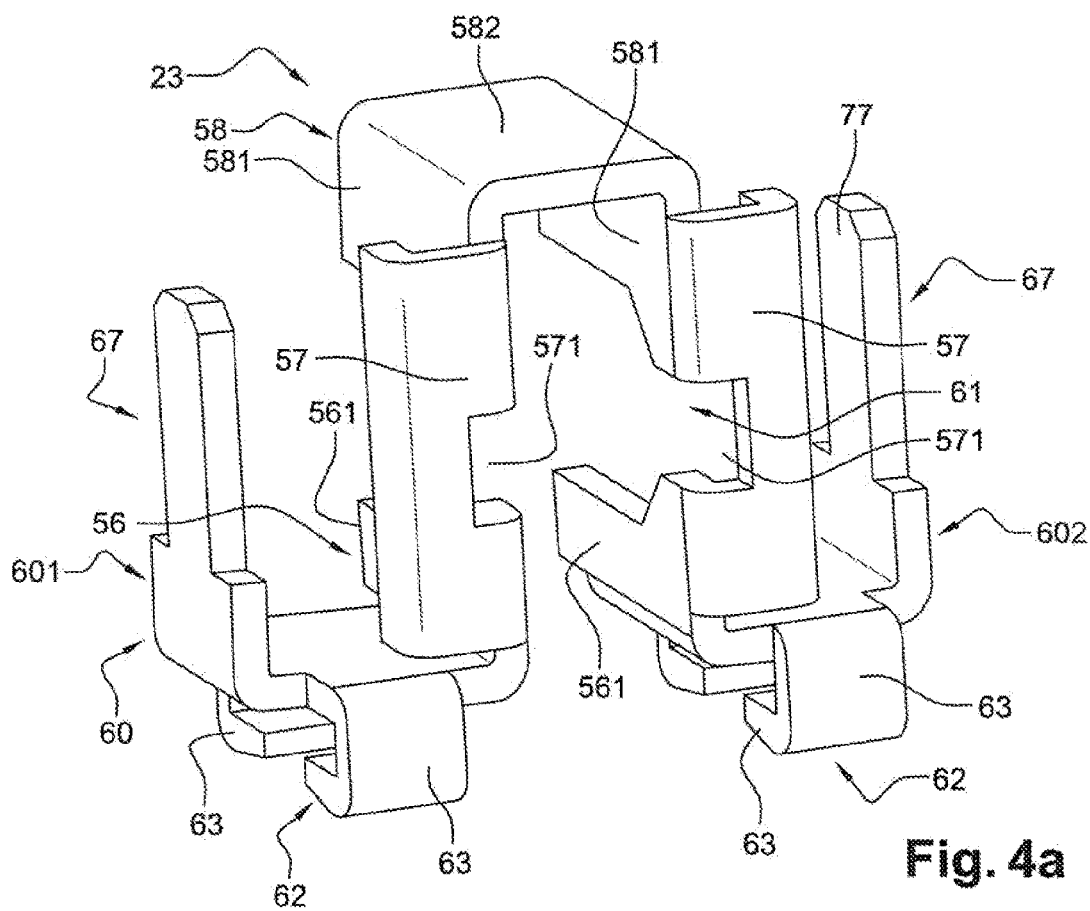
FIGS. 4a to 4c show respectively views in perspective of the front and rear, as well as a front view of a brush cage according to the invention.
Figure 4B:
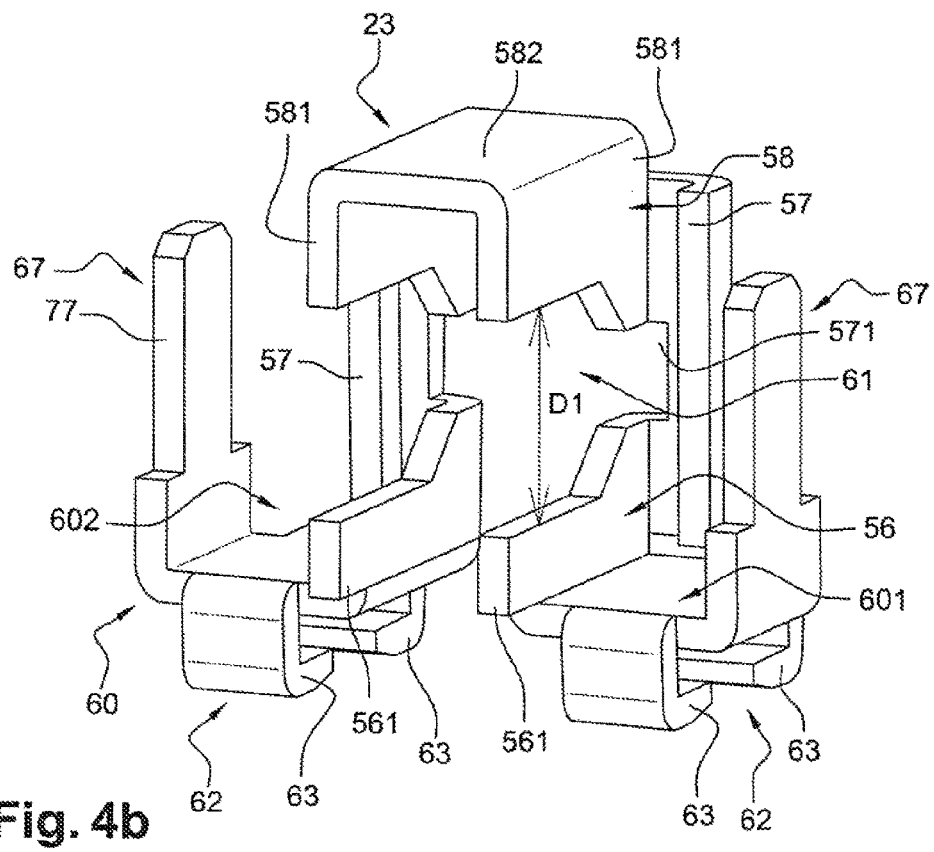
Figure 4C:
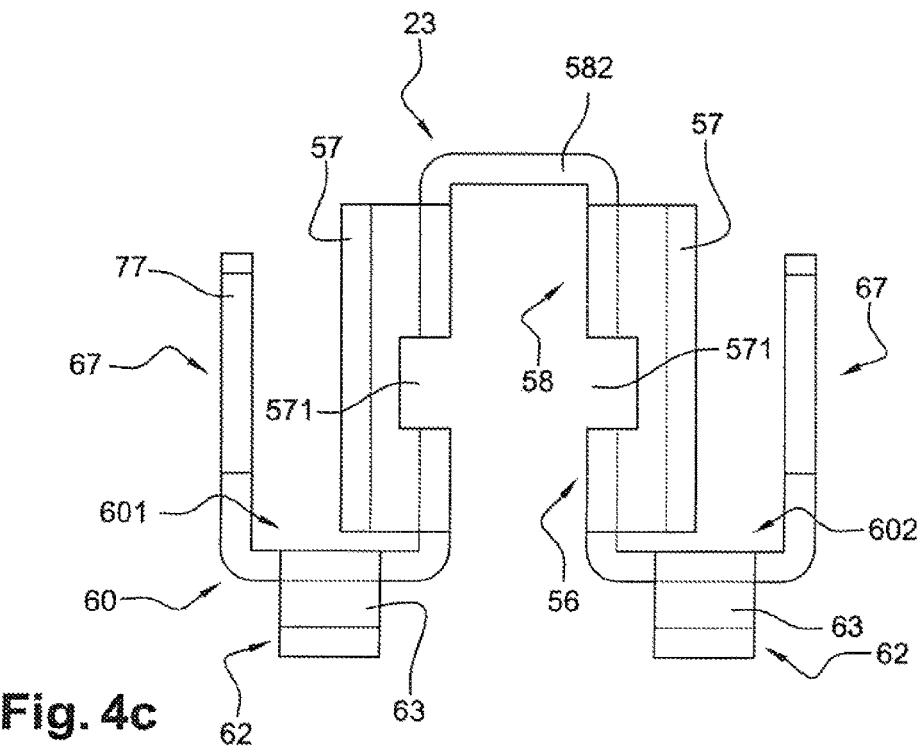

As can be seen clearly in FIGS. 4a to 4c, the brush cages 23 each comprise a lower portion 56 for guiding of the brush, which portion is connected to a support 60, and an upper portion 58 for guiding of the brush. The lower guiding portion 56 is formed by two lateral walls 561 which are parallel to one another, and are connected to the support 60, whereas the upper guiding portion 58 is formed by two lateral walls 581 which are parallel to one another, and are connected to one another by a solid (i.e., not interrupted by a break or slit) transverse (or upper) wall 582. These portions 56 and 58 are open on the side of the front surface 35 and the rear surface 38 of the brush 25. The lower 56 and upper 58 guiding portions are separated from one another by a space 61 in order to permit the passage of the braid of the brush 25. As best shown in FIGS. 4a-4c, the space 61 is delimited by the transverse wall 582 and the lower 56 and upper 58 guiding portions. As can be seen in FIG. 4b, a dimension D1 of the space 61 between the portions 56 and 58, measured according to a direction perpendicular to the upper wall 582, tends to decrease when displacement takes place from the rear towards the front of the brush cage 23. In order to vary the distance between the two portions 56, 58, the edges of the lateral walls 561, 581 which delimit the space 61 are in the form of a ramp, which extends between two areas where the distance between the two portions 56, 58 is constant. The ramps of the edges of the lateral surfaces 561, 581 are symmetrical relative to a horizontal median plane of the brush cage 23. Alternatively, the lateral walls 561, 581 are in the form of an "L", as shown in FIGS. 1a, 2a and 5 a.

In addition, as can be seen clearly in FIGS. 4a to 4c, each brush cage 23 comprises two flaps 57 which connect the lower 56 and upper 58 guiding portions to one another. These flaps 57 are situated on the front surface 35 side of the brush 25, along vertical edges of the lateral walls 561, 581 of the portions 56 and 58. In FIGS. 4a to 4c, each flap 57 has a first part which extends perpendicularly to the lateral walls 561, 581, and a second part which is turned back towards the rear surface 38 of the brush 25. In FIGS. 1a, 1b, 2a, 2b, the flaps 57 extend substantially circumferentially on both sides of the brush cage 23, such as to follow the curvature of an outer periphery of the collector 27.

Each flap 57 comprises an opening 571 which is situated in the extension of the space 61, in order to permit displacement of the braid of the brush 25 as close as possible to the collector 27. This therefore maximises the useful length of the brush 25. As shown in FIG. 4c, in a front view of the brush cage 23, each opening 571 extends according to a direction perpendicular to the upper wall 582, and a direction perpendicular to the lateral surfaces 561, 581. In this case, the openings 571 have a rectangular form, but as a variant they could have any other form, such as a form in an arc of a circle. This depends on the application envisaged.

As can be seen in FIGS. 4a to 4c, the support 60 is in two parts 601, 602, which are each connected to a lower edge of a lateral surface 561 of the lower guiding portion 56.

Each part 601, 602 comprises a system 62 for securing the brush cage 23 on the body 22 of the brush-holder 21. Each securing system 62 is formed by two branches 63 which form a hook, and are folded back towards one another at the level of their end. More specifically, as can be seen clearly in FIG. 5c, the branches 63 derived from the front and rear edges of the support 60 pass through the body 22 according to its thickness, and are folded back towards one another at their end against the bearing plate 28 of the body. In a side view, the branches of a single securing system 62 thus have the form of a "C", with the hollows of the "C" of the two branches 63 facing towards one another.

Figure 6:
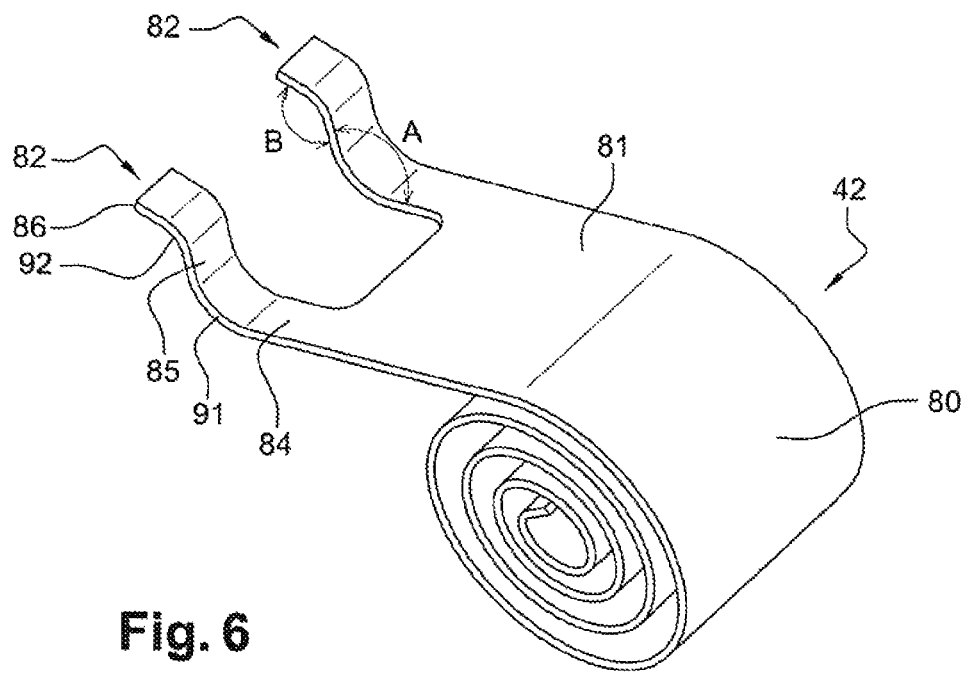
In FIG. 6 shows a detailed view of the spiral spring used in the first embodiment of the brush-holder according to the invention.

In the embodiment in FIGS. 4a to 4c, each part 601, 602 of the support 60 comprises a system 67 for retention of a spiral spring formed by a pin 77 with a substantially rectangular cross-section, around which there is positioned the spring 42 shown in detail in FIG. 6. The pin 77 has two parts with different cross-sections which delimit a shoulder at the level of a junction between the two parts. An inner part of the spring 42 can thus be supported against the shoulder, in order to guarantee accurate positioning of the spring 42. Alternatively, as shown in FIGS. 1a, 1b, 2a, 2b, the support 60 comprises a single retention system 67.

As shown in FIG. 6, the spring 42 comprises a wound part 80 formed by a plurality of substantially concentric spirals of a flat metal strip wound around itself The wound part 80 ends in a flat end 81 of the strip. This flat end 81 is extended by two arms 82 which are parallel to one another, and are designed to be supported against the support surfaces 39 of the rear surface of the brush. These arms 82 are each situated in an extension of one of the edges of the flat end 81.

Each arm 82 comprises a first straight portion 84 which extends on the plane of the flat end 81 of the spring, and a second straight portion 85 which extends in a direction spaced from the wound part 80. The straight portion 85 is connected to the portion 84 by means of a folded portion 91 with a rounded form. The straight portion 85 is also connected to a third straight portion 86 by means of a second folded portion 92 with a rounded form. According to one embodiment, the straight portion 84 forms together with the straight portion 85 an angle A of approximately 90°, whereas the straight portion 86 forms together with the straight portion 85 an angle B of approximately 135°.

A configuration of this type of the arms 82 makes it possible to guarantee good support surface for the arms 82 of the spring against the rear surface 38 of the brush 25, irrespective of the state of wear of the brush 25. In fact, as can be seen clearly in FIG. 1b, when the brush 25 is not yet worn, the folded portion 92 ensures the contact of the arms 82 of the spring 42 against the rear surface 38 of the brush 25. When the brush 25 is worn, and the arms 82 have been displaced in rotation (cf. FIG. 2b), the straight portion 86 ensures the contact of the arms 82 of the spring 42 against the rear surface 38 of the brush 25.

In order to produce the arms 82, a portion of material with a rectangular form is removed from the flat end of the strip, such as to obtain straight portions which are parallel to one another, and form the shape of a "U" together with the end of the strip. These portions are then folded according to the required form of the arms 82.

Alternatively, in the embodiment in FIGS. 5a to 5c, the system 67 for retention of the spring 42 is formed by three teeth 68-70, between which there is retained an end of the spring 42 which is described in greater detail hereinafter. Two teeth 68, 69 are situated on the same plane, whereas the third tooth 70 is situated between the first two teeth 68, 69. In addition, the tooth 70 is raised relative to the teeth 68 and 69, i.e. it is situated on a plane which is offset relative to the two teeth 68 and 69.

In this embodiment, the spiral spring 42 is formed from a metal wire with a small diameter. As can be seen in FIGS. 5a and 5c, the spring 42 has an end 72 which is folded in the form of a "U" positioned between the teeth 68-70 of the system 67, and two sets 73 of spirals, each derived from one of the stems of the "U" which face one another. Each set 73 of spirals positioned around the teeth 68-70 ends in an arm 74 with a return 75 which can be seen in FIG. 5a, and is designed to be supported against a support surface 39 of the brush 25.

The assembly of the different elements of the brush-holder 21 according to the invention is described hereinafter.

In a first stage, the brush cage 23 is secured on the body 22 of the brush holder by means of securing systems 62. The brush 25 is then positioned from the rear in the interior of the brush cage 23.

According to the configuration of the spiral spring 42, the latter is put into position on the retention system 67, which is designed such that the arms of the spring are positioned supported against the back of the brush 25.

Thus, in the embodiment in FIGS. 1 and 2, the wound part 80 of the spring 42 is positioned around the pin 77, such that an end of the wound part is supported against the shoulder of the pin 77. The arms 82 of the spring 42 are displaced in rotation, in order to be positioned against the support surfaces 39 of the brush 25. Displacement of this type of the arms 82 tends to deform the wound part 80 retained by the pin 77, such that the arms 82 supported against the rear surface 38 of the brush 25 thrust the brush 25 in the direction of the collector 27.

In the embodiment in FIGS. 5a to 5c, the end 72 of the spring 42 in the form of a "U" is positioned between the teeth 68-70 of the retention system 67. The arms 74 are positioned supported via the returns 75 which can be seen in FIG. 5a, against a support surface 39 of the brush 25, such that the arms 74 thrust the brush 25 in the direction of the collector 27.

In both cases, the guiding in translation of the brush 25 is ensured by the lateral walls 261, 281 of the lower 56 and upper 58 portions of the brush cage 23, the upper wall 582 of the upper portion 58, and the surface of the body 22 on which the brush 25 is supported. In this case, as can be seen in FIG. 5a, the brush 25 is supported against the base of a groove 65 provided in the upper surface of the body 22.

It will be appreciated that persons skilled in the art will be able to modify the configurations of the brush cage 23 and the brush-holder 21 shown in the figures without departing from the context of the invention. Thus, as a variant in particular, the brush 25 comprises only a single support surface 39 on its rear surface 38, and a spring with a single arm can then be used.

Figure 7:
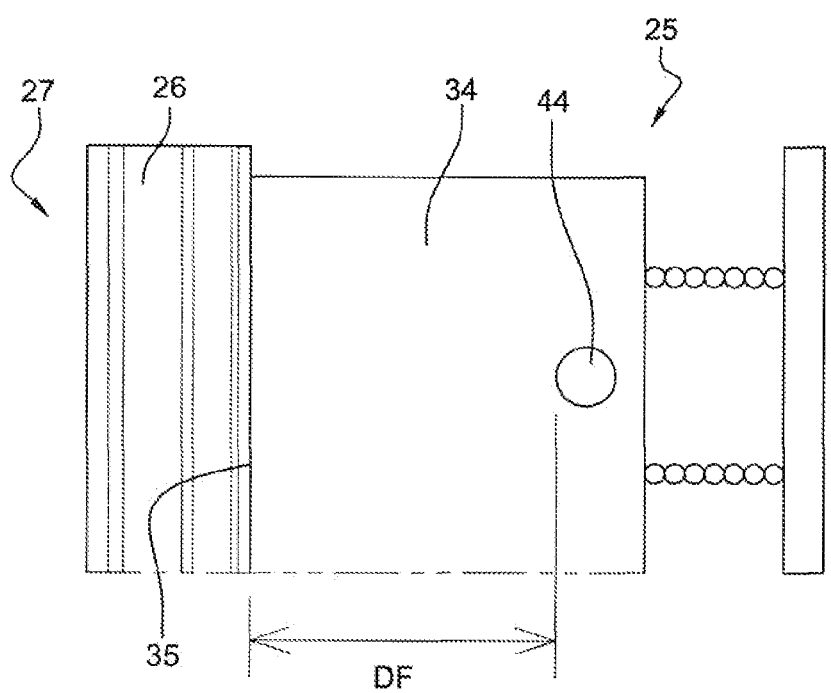
FIG. 7 shows a view from above of another type of brush which can be used in combination with the brush cage according to the invention.

As a variant, the brush 25 has a conventional parallelepi-ped form shown in FIG. 7, the braid being secured on a lateral surface of the brush 25 as previously, via the securing area 44. The configuration of the brush cage 23 will make it possible to maximise the useful length of this type of brush 25 without a recess 50, in order to form the support surfaces 39.

As shown in FIG. 3, the spiral spring 42 can be replaced by a cylindrical spring 42' which is supported on a cover 98, in order to thrust the brush 21 against the plates 26 of the collector 27.

As a variant, the brush cage 23 is without a flap 57 and the lateral walls 561, 581 are then connected to one another on the front surface side of the brush 25. As a variant, the flaps 57 are without an opening 571.

It is also apparent that certain characteristics described in a particular embodiment could be transposed without diffi-culty to another embodiment.

In this document, relative terms of the type such as "lower", "upper", "horizontal" or "vertical" are understood relative to a brush cage 23 which is supported on a flat support, with the lower guiding portion 56 being closest to the support, whereas the upper guiding portion 58 is furthest from the support, as represented in FIGS. 1a, 2a, 4a-4c and 5c. The "rear" and "front" parts of the brush cage 23 are situated respectively on the front surface 35 side of the brush 25 which is designed to be supported against the collector 27, and on the rear surface 38 side of the brush 25 against which the arms of the spring 42 are supported.

The invention claimed is:

1. A brush cage (23) for a brush-holder (21) acting as a receptacle for a brush (25) of an electrical machine, the brush cage (23) comprising:
   a first guiding portion (56) for guiding of the brush; and
   a second guiding portion (58) for guiding of the brush;
   the first and second guiding portions being open on a side of a front surface (35) of the brush (25) configured to be supported against a collector of the electrical machine and on a side of a rear surface (38) of the brush (25) against which a spring is configured to be supported;
   the brush cage (23) defining at least one space (61) between the first and second guiding portions (56, 58), the at least one space (61) configured to permit the passage of a connection braid (45) of the brush (25) as far as an end of the front surface (35) of the brush (25).

2. The brush cage according to claim 1, wherein the at least one space is situated in a lateral surface of the brush cage which separates two lateral walls.

3. The brush cage according to claim 2, wherein the first guiding portion is a lower guiding portion (56) formed by two lateral walls (561) parallel to one another, and the second guiding portion is an upper guiding portion (58) formed by two lateral walls (581) parallel to one another, and wherein the two lateral walls of the upper guiding portion (58) are connected to one another at least by a transverse wall (582).

4. The brush cage according to claim 1, wherein the second guiding portion (58) includes a solid transverse wall and two lateral walls connected by the solid transverse wall.

5. The brush cage according to claim 1, wherein the first guiding portion is a lower guiding portion (56) formed by two lateral walls (561) parallel to one another, and the second guiding portion is an upper guiding portion (58) formed by the two lateral walls (581) parallel to one another, and wherein the two lateral walls of the upper guiding portion (58) are connected to one another at least by a transverse wall (582).

6. The brush cage according to claim 1, wherein a dimension (D1) of the at least one space between the first guiding portion and the second guiding portion decreases when displacement from the rear towards the front of the brush cage (23) takes place.

7. The brush cage according to claim 1, further comprising a support (60) connected to one of the first and second guiding portions, wherein the support (60) comprises at least one system (62) for securing of the brush cage (23) on a body (22) of the brush-holder (21).

8. The brush cage according to claim 7, wherein the securing system (62) comprises two branches (63) forming a hook, which are turned back towards one another at a level of their end.

9. The brush cage according to claim 1, further comprising at least one system (67) for retention of a spiral spring (42).

10. The brush cage according to claim 9, wherein the retention system (67) is formed by a pin (77) with two parts with different cross-sections which delimit a shoulder at a level of a junction between the two parts.

11. The brush cage according to claim 9, wherein the retention system (67) comprises three teeth (68-70), with one of the teeth (70) situated between the other two teeth (68, 69) being positioned on a plane which is offset relative to the plane on which the other two teeth are situated.

12. A brush cage (23) for a brush-holder (21) acting as a receptacle for a brush (25) of an electrical machine, the brush cage (23) comprising:
a first guiding portion (56) for guiding the brush;
a second guiding portion (58) for guiding the brush; and
two flaps (57) connecting the first and second guiding portions to one another;
the first and second guiding portions being open on a side of a front surface (35) of the brush (25) configured to be supported against a collector of the electrical machine and on a side of a rear surface (38) of the brush (25) against which a spring is configured to be supported;
the brush cage (23) defining at least one space (61) between the first and second guiding portions (56, 58), the at least one space (61) configured to permit passage of a connection braid (45) of the brush (25) as far as an end of the front surface (35) of the brush (25);
each flap (57) comprising an opening (571) situated in an extension of the at least one space (61) between the first and second guiding portions, in order to permit displacement of the braid of the brush (25) as close as possible to the collector of the electrical machine.

13. The brush cage according to claim 12, wherein the at least one space is situated in a lateral surface of the brush cage which separates two lateral walls.

14. The brush cage according to claim 12, wherein the second guiding portion (58) includes a solid transverse wall and two lateral walls connected by the solid transverse wall.

15. The brush cage according to claim 12, wherein the first guiding portion is a lower guiding portion (56) formed by two lateral walls (561) parallel to one another, and the second guiding portion is an upper guiding portion (58) formed by the two lateral walls (581) parallel to one another, and wherein the two lateral walls of the upper guiding portion (58) are connected to one another at least by a transverse wall (582).

16. A brush-holder (21) for an electrical machine, comprising:
a body (22);
at least one brush cage (23) according to claim 1 secured on said body (22);
a brush (25) positioned in an interior of the brush cage (23);
a connection braid (45) connected to the brush (25); and
a spring (42) fitted to exert a force between the brush (25) and the body (22), the spring being in contact on a rear surface of the brush (25);
the connection braid (45) being connected to a surface of the brush (25) facing the at least one space between the first and second guiding portions of the brush (25);
the brush cage (23) configured as a receptacle for the brush (25), the brush cage (23) comprising:
a first guiding portion (56) for guiding the brush; and
a second guiding portion (58) for guiding the brush;
the first and second guiding portions being open on a side of a front surface (35) of the brush (25) configured to be supported against a collector of the electrical machine and on a side of a rear surface (38) of the brush (25) against which a spring is configured to be supported;
the brush cage (23) defining at least one space (61) between the first and second guiding portions (56, 58), the at least one space (61) configured to permit the passage of a braid of the brush (25) as far as an end of the front surface (35) of the brush (25).

17. The brush-holder according to claim 16, wherein the brush (25) comprises two support surfaces (39) which are defined by the base of recesses (50) provided in the rear surface of the brush, and wherein the connection braid (45) is connected to the brushes between the recesses (50).

18. The brush-holder according to claim 16, wherein the spring (42) is of the spiral type, and has an end (72) which is folded in the form of a "U" and two sets (73) of spirals each derived from one of the stems of the "U" opposite one another, each set (73) of the spirals ending in an arm (74) with a return (75) which is designed to be supported against a surface of the brush.

19. The brush-holder according to claim 16, wherein the spring (42) is of the spiral type, and comprises a wound part (80) which is formed by a plurality of substantially concentric spirals of a flat strip which is wound around itself, the wound part (80) ending in a flat end (81) which is extended by at least one arm (82) designed to be supported against a surface of the brush (25).

* * * * *